United States Patent
Goto

(10) Patent No.: US 7,148,983 B2
(45) Date of Patent: Dec. 12, 2006

(54) IMAGE INPUT SYSTEM

(75) Inventor: Koji Goto, Numazu (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 907 days.

(21) Appl. No.: 10/058,782

(22) Filed: Jan. 30, 2002

(65) Prior Publication Data

US 2003/0020949 A1    Jan. 30, 2003

(30) Foreign Application Priority Data

Mar. 19, 2001 (JP) ............... 2001-079151

(51) Int. Cl.
   *G06F 15/16* (2006.01)
   *H04N 1/00* (2006.01)
(52) U.S. Cl. ............... 358/1.15; 358/403
(58) Field of Classification Search .......... 358/1.15, 358/402, 403, 407, 408, 442, 443, 444; 379/100.01, 379/100.08, 100.09; 709/217, 218, 219
   See application file for complete search history.

(56) References Cited

U.S. PATENT DOCUMENTS 5,739,918 A * 4/1998 Ouchi .................. 358/703
5,760,917 A * 6/1998 Sheridan ................ 358/442
6,166,826 A * 12/2000 Yokoyama .............. 358/1.16
6,188,766 B1 * 2/2001 Kocher .................. 380/246
6,208,426 B1 * 3/2001 Saito et al. ............. 358/1.15
6,950,198 B1 * 9/2005 Berarducci et al. ...... 358/1.12
2001/0003189 A1 * 6/2001 Miyazawa et al. ........ 709/206

FOREIGN PATENT DOCUMENTS

JP    2000-59560    2/2000
JP    2000-349952    12/2000

* cited by examiner

*Primary Examiner*—Joseph R. Pokrzywa
(74) *Attorney, Agent, or Firm*—Foley & Lardner LLP

(57) ABSTRACT

In a state in which plural public folders are set in a digital multi-functional peripheral (MFP) and made public on a network, a first PC transmits, at the time of activation, designated to-be-monitored folder list data on first PC to a second PC. When second PC has received the designated to-be-monitored folder list data from first PC, second PC collates the received designated to-be-monitored folder list data with its own designated to-be-monitored folder list data. Second PC returns to first PC permission/non-permission data that rejects designation of a public folder as a to-be-monitored folder, if the public folder has already been designated as a to-be-monitored folder ("exclusion process") and permits access to other public folders.

14 Claims, 8 Drawing Sheets

IMAGE INPUT SYSTEM

CROSS-REFERENCE TO RELATED APPLICATIONS

This application is based upon and claims the benefit of priority from the prior Japanese Patent Application No. 2001-079151, filed Mar. 19, 2001, the entire contents of which are incorporated herein by reference.

BACKGROUND OF THE INVENTION

1. Field of the Invention

The present invention relates to an image input system for inputting image data, wherein a digital multi-functional peripheral (MFP) having an auxiliary storage device capable of storing image data, a scanner function and a network function is connected to a network.

2. Description of the Related Art

There is known an image forming system wherein a digital MFP, on the one hand, which has an auxiliary storage device (e.g. hard disk drive) capable of storing image data, a scanner function and a network function, and a personal computer (PC), on the other, are connected to a network such as a LAN. When a user, who is present at the place of his/her PC, is to take in image data into his/her PC by using the digital MFP, he/she goes to the place of the digital MFP from the PC, and performs a scanning operation and stores image data in the auxiliary storage device.

Using the network function, a controller of the digital MFP stores the image data taken in by the scanner function in the form of a file in a public folder (directory) made public in a protocol compatible with a file sharing function of the PC. The public folder is set to be accessible by any user's PC by authentication.

When the user inspects, edits and saves the image data scanned by the digital MFP on his/her PC, he/she activates a specified application (program), accesses the public folder of the digital MFP via the network, performs a process for saving an image data file in a local drive (HDD, etc.) of his/her own PC, and then opens the file.

In this prior-art method, however, time-consuming procedures have to be carried out for the pre-setting of the digital MFP, the scanning operation, the taking-in of the image data file, the activation of the application, and the opening of the file. Moreover, a great deal of time and labor is required when a large volume of image data files are processed.

In order to carry out these procedures, the user has to be familiar with not only the operations of the digital MFP, but also the operations (network application) of the PC. Thus, these procedures cannot be carried out by anyone, without appropriate skills.

Conventional solutions to these problems will now be described.

When image data taken in by the scanner function of the digital MFP is stored as an image data file in a public folder in a controller of the digital MFP, a setting file is created to describe the title of the file, the location, the date/time, group access information, etc. The setting file is stored along with the image data file.

On the other hand, agent software for always executing a program in the background processing is installed in the PC of the user. The agent software accesses the public folder in the controller of the digital MFP via the network, and acquires a secondary file of the image data file.

The agent software stores an image data file in an auxiliary storage device (e.g. HDD) of the PC on the basis of the information in the acquired secondary file. The agent software deletes the description of the image data file, with respect to which the processing of the secondary file has been finished, and stores once again the resultant file in the public folder of the controller of the digital MFP via the network.

In this method, software has to be installed both in the digital MFP (scanner function section) and the client PC. It is difficult to apply this method to a network to which a digital MFP not matching with the software is connected.

Besides, when image data is to be made public in the public folder of the digital MFP, the procedure for authorizing access by the user is complex, and, in many cases, access is permitted to all clients' PCs without authentication. As a result, there was a case where image data temporarily stored in the digital MFP was inspected by an unauthorized user other than the owner of the image data, and a secret leaked.

BRIEF SUMMARY OF THE INVENTION

An object of the present invention is to provide an image input system capable of inputting an image with a simple operation, and acquiring the input image data with a simple operation.

Another object of the invention is to provide an image input system which permits creation of a system even capable of including a digital multi-functional peripheral (MFP) which cannot use new software.

Still another object of the invention is to provide an image input system capable of preventing leakage of a secret when image data is made public in a public folder in a digital MFP.

In order to achieve the objects, the invention may provide an image input system in which a plurality of image forming apparatuses, each having a scanner function, a printer function and a network function and forming an image, and a plurality of personal computers are connected to a network, each of the image forming apparatuses comprising: first setting means for setting a public folder made public on the network; and storage means for setting therein at least one public folder through the setting by the first setting means; each of the personal computers comprising: second setting means for setting exclusion of access by another personal computer to the public folder set in the image forming apparatus; transmission means for transmitting to the another personal computer via the network access exclusion setting information for excluding access to the at least one public folder set by the second setting means; reception means for receiving via the network permission/non-permission information on the access exclusion setting, which is returned from the another personal computer in response to the access exclusion setting information transmitted by the transmission means; and control means for executing a control for at least one public folder, on which access has been permitted in the access exclusion setting, on the basis of the permission/non-permission information on the access exclusion setting.

The invention may provide an image input system in which a plurality of image forming apparatuses, each having a scanner function, a printer function and a network function and forming an image, and a plurality of personal computers are connected to a network, each of the image forming apparatuses comprising: first setting means for setting a public folder made public on the network; and first storage means for setting therein at least one public folder through the setting by the first setting means; each of the personal computers comprising: second storage means for storing access exclusion setting information which excludes access by another personal computer to the public folder set at the time of activation; reception means for receiving via the network access exclusion setting information, which is sent from another personal computer; preparation means for comparing the access exclusion setting information received by the reception means with the access exclusion setting information stored in the second storage means, and preparing permission/non-permission information that rejects access to a public folder on which the exclusion of access has been set, and that permits access to a public folder on which the exclusion of access is not set; and returning means for returning the permission/non-permission information prepared by the preparation means to the personal computer from which the access exclusion setting information was received by the reception means.

The invention may provide an image input system in which a plurality of image forming apparatuses, each having a scanner function, a printer function and a network function and forming an image, and a plurality of personal computers are connected to a network, each of the image forming apparatuses comprising: first setting means for setting a public folder made public on the network; and first storage means for setting therein at least one public folder through the setting by the first setting means; each of the personal computers comprising: second storage means for storing access exclusion setting information which excludes access by another personal computer to the public folder set in the image forming apparatus; transmission means for transmitting the access exclusion setting information stored in the second storage means to another personal computer via the network at the time of activation; reception means for receiving via the network permission/non-permission information on the access exclusion setting returned to the another personal computer in response to the access exclusion setting information transmitted by the transmission means; and control means for updating the access exclusion setting information stored in the second storage means and executing a control for at least one public folder, on which access has been permitted in the access exclusion setting, on the basis of the permission/non-permission information on the access exclusion setting, which has been received by the reception means.

The invention may provide an image input system in which a plurality of input apparatuses, each having a storage device for setting a public folder to be made public on a network and each inputting information such as image data, and a plurality of personal computers are connected to the network, comprising: setting means for setting exclusion of access by another personal computer to the public folder set in the input apparatus; transmission means for transmitting to the another personal computer via the network access exclusion setting information for excluding access to the at least one public folder set by the setting means; reception means for receiving via the network permission/non-permission information on the access exclusion setting, which is returned from the another personal computer in response to the access exclusion setting information transmitted by the transmission means; and control means for executing a control for at least one public folder, on which access has been permitted in the access exclusion setting, on the basis of the permission/non-permission information on the access exclusion setting, which has been received by the reception means.

DETAILED DESCRIPTION OF THE INVENTION

An embodiment of the present invention will now be described with reference to the accompanying drawings.

Figure 1:
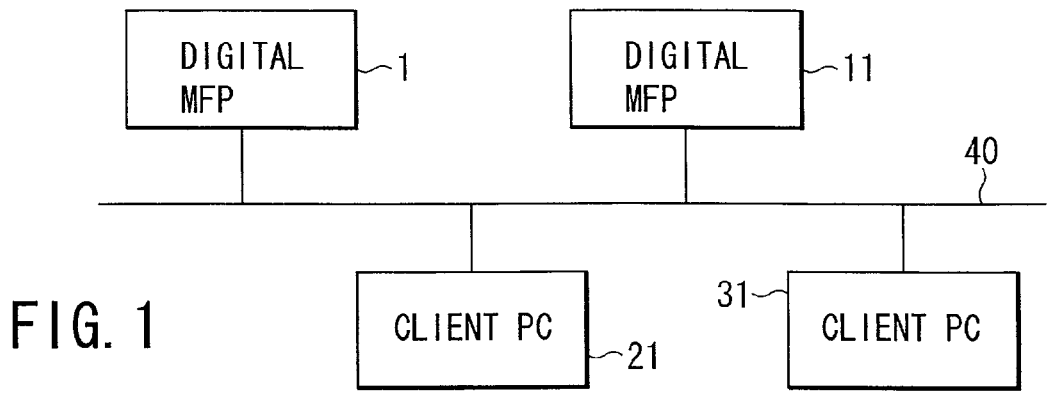
FIG. 1 is a block diagram schematically showing the structure of a network image forming system according to an image input system of the present invention.

FIG. 1 schematically shows the structure of a network image forming system according to an image input system of the present invention. The network image forming system is configured such that a digital multi-functional peripheral (MFP) 1, 11 serving as an image forming apparatus having a storage device capable of storing image data, a scanner function, a printer function and a network function, on the one hand, and a client personal computer (PC) 21, 31 possessed by a client, on the other, are connected via a network (Local Area Network, etc.) 40.

In the network image forming system according to this embodiment, the network 40, for instance, may be connected to another network via one or more rooters, thus constituting a sub-network between rooters. In this case, however, the sub-network formed by the network 40 has to be designed to prevent information including image data from being transmitted/received beyond the rooter.

Figure 2:
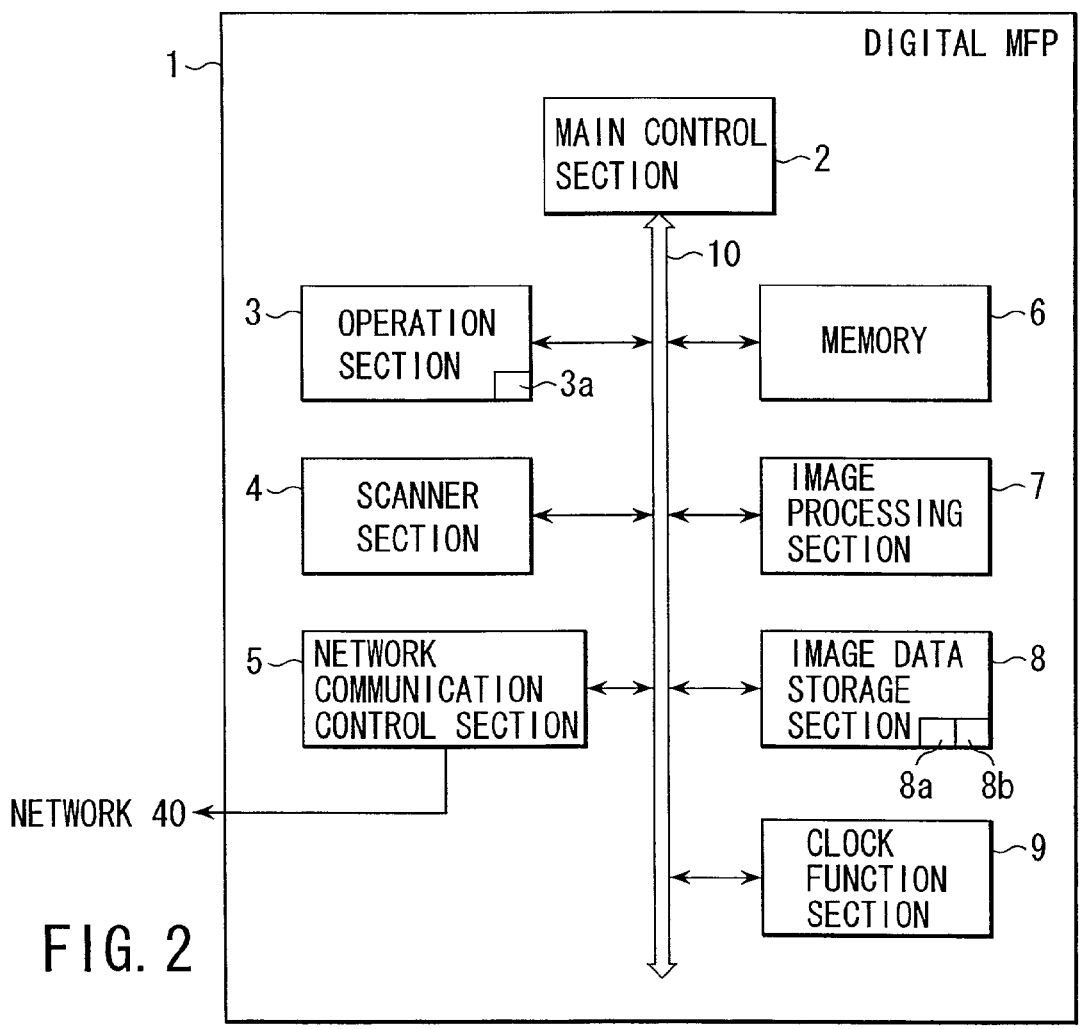
FIG. 2 is a block diagram schematically showing the structure of a digital multi-functional peripheral (MFP)

FIG. 2 schematically shows the structure of the digital MFP 1. The digital MFP 1 comprises a main control section 2, an operation section 3, a scanner section 4, a memory 6, an image processing section 7, an image data storage section 8, and a clock function section 9. These elements are interconnected via a bus 10, with the main control section 2 functioning as a hub.

The main control section 2 comprises a CPU. The main control section 2 controls the entirety of the digital MFP 1 according to prestored programs. The operation section 3 comprises hard keys such as numeral keys, cursor keys and a start button 3a. The scanner section 4 optically scans an original (document) and converts the scanned image to original image data. The network communication control section 5 controls connection to the network 40.

The memory 6 includes a ROM, a RAM, etc. storing various information and control programs. The memory 6 is used when the main control section 2 executes controls. The image processing section 7 performs various processes such as a process for encoding the scanned image data.

The image data storage section 8 comprises a hard disk drive, etc., and stores image data. Public folders, which are made public on the network 40, are set in the image data storage section 8, as will be described later in detail.

The clock function section 9 is used to add date information when image data is stored in the image data storage section 8.

Figure 3:
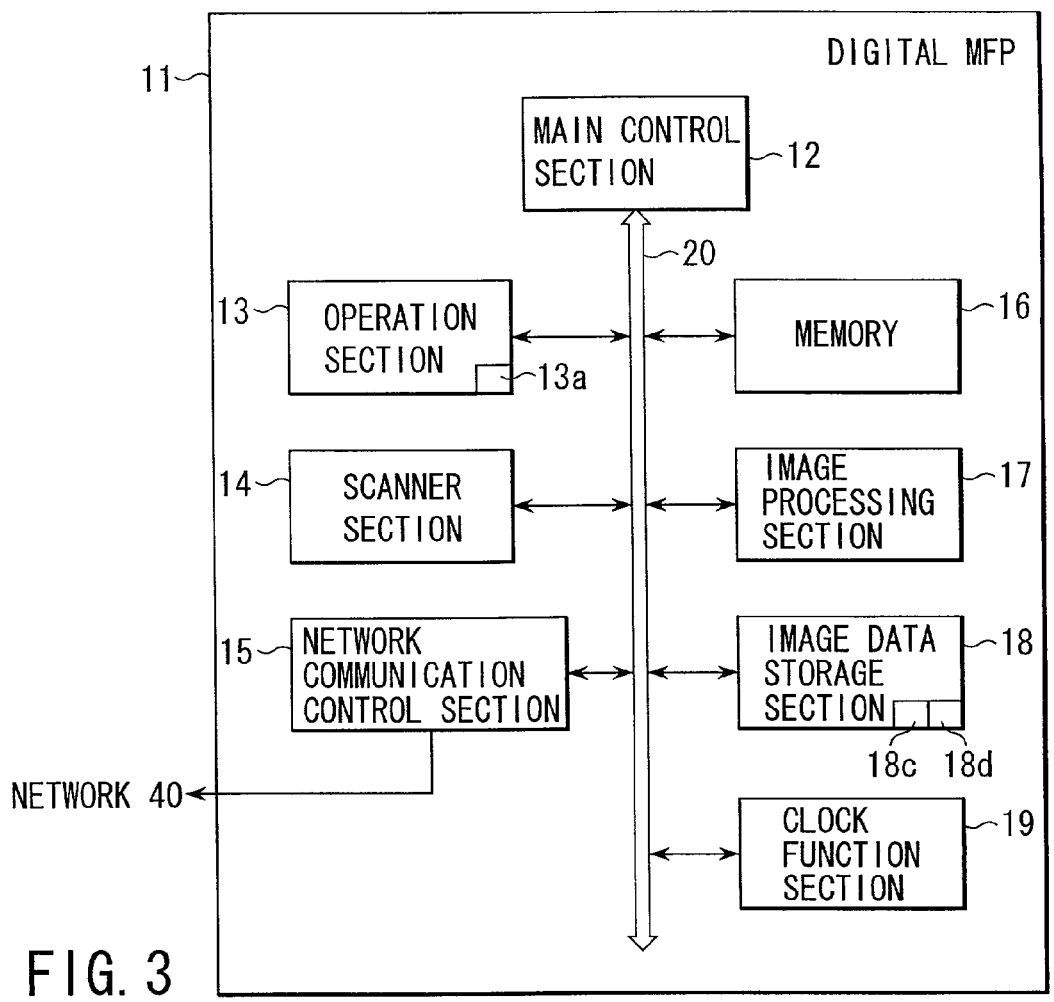
FIG. 3 is a block diagram schematically showing the structure of a digital multi-functional peripheral (MFP)

FIG. 3 schematically shows the structure of the digital MFP 11. The digital MFP 11 comprises a main control section 12, an operation section 13, a scanner section 14, a memory 16, an image processing section 17, an image data storage section 18, and a clock function section 19. These elements are interconnected via a bus 20, with the main control section 12 functioning as a hub.

The main control section 12 comprises a CPU. The main control section 12 controls the entirety of the digital MFP 11 according to prestored programs. The operation section 13 comprises hard keys such as numeral keys, cursor keys and a start button 13a. The scanner section 14 optically scans an original (document) and converts the scanned image to original image data. The network communication control section 15 controls connection to the network 40.

The memory 16 includes a ROM, a RAM, etc. storing various information and control programs. The memory 16 is used when the main control section 12 executes controls. The image processing section 17 performs various processes such as a process for encoding the scanned image data.

The image data storage section 18 comprises a hard disk drive, etc., and stores image data. Public folders, which are made public on the network 40, are set in the image data storage section 18, as will be described later in detail.

The clock function section 19 is used to add date information when image data is stored in the image data storage section 18.

Figure 4:
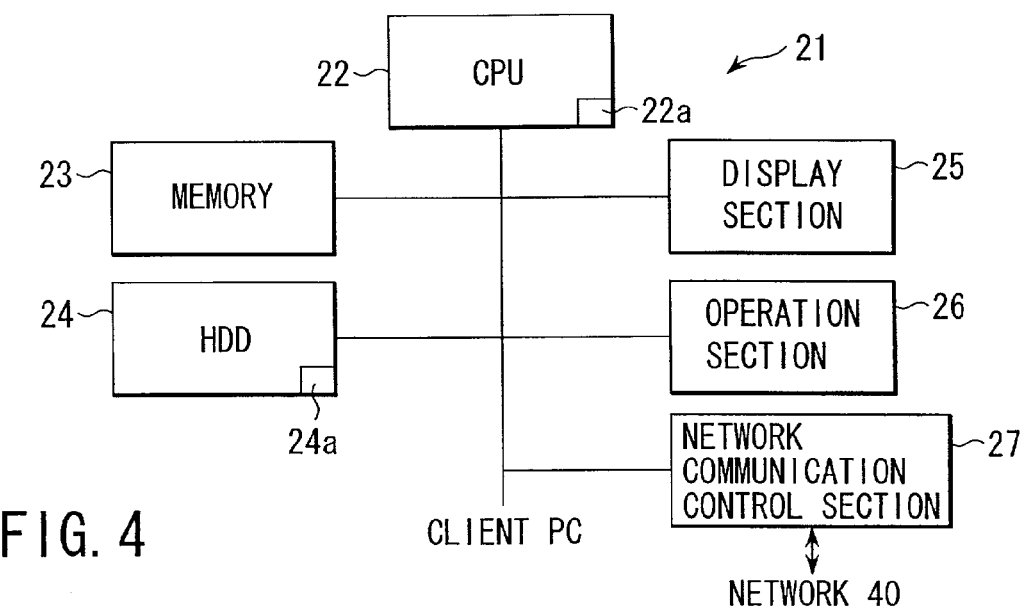
FIG. 4 is a block diagram schematically showing the structure of a client PC.

FIG. 4 schematically shows the structure of the client PC 21. The client PC 21 comprises a CPU 22 for controlling the entirety of the PC 21, a memory 23 for temporarily storing various information and control data, a hard disk drive (HDD) 24 for storing various data such as files, a display 25 composed of a liquid crystal display for displaying various information, an operation section 26 composed of a mouse and a keyboard, and a network communication control section 27 for controlling connection to the network 40.

The CPU 22 includes a timer 22a for measuring the date/time.

The memory 23 prestores application programs for setting and monitoring folders to be monitored (hereinafter referred to as "to-be-monitored folders") in association with the public folders according to the present invention. These programs are executed by the CPU 22, as will be described later in detail.

The HDD 24 includes a hold section 24a for holding designated to-be-monitored folder list data (to be described later).

Figure 5:
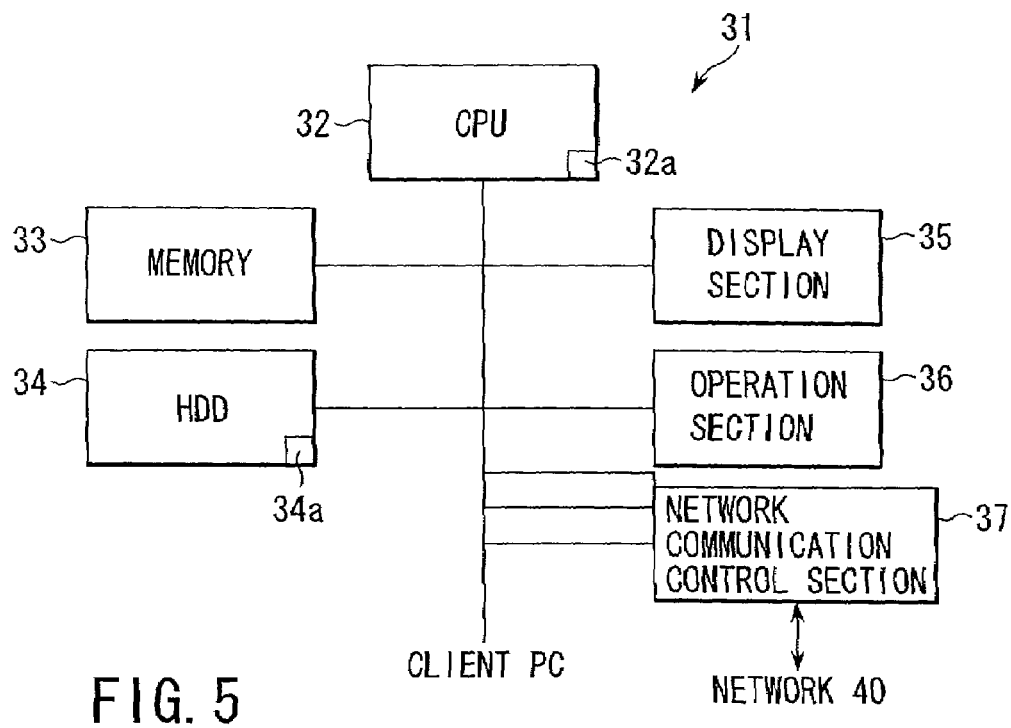
FIG. 5 is a block diagram schematically showing the structure of a client PC.

FIG. 5 schematically shows the structure of the client PC 31. The client PC 31 comprises a CPU 32 for controlling the entirety of the PC 31, a memory 33 for temporarily storing various information and control data, a hard disk drive (HDD) 34 for storing various data such as files, a display 35 composed of a liquid crystal display for displaying various information, an operation section 36 composed of a mouse and a keyboard, and a network communication control section 37 for controlling connection to the network 40.

The CPU 32 includes a timer 32a for measuring the date and time.

The memory 33 prestores application programs for to-be-monitored folder setting and monitoring according to the present invention in association with the public folders. These programs are executed by the CPU 32, as will be described later in detail.

The HDD 34 includes a hold section 24a for holding data on a designated to-be-monitored folder list (hereinafter referred to as "designated to-be-monitored folder list data), which will be described later.

Figure 6:
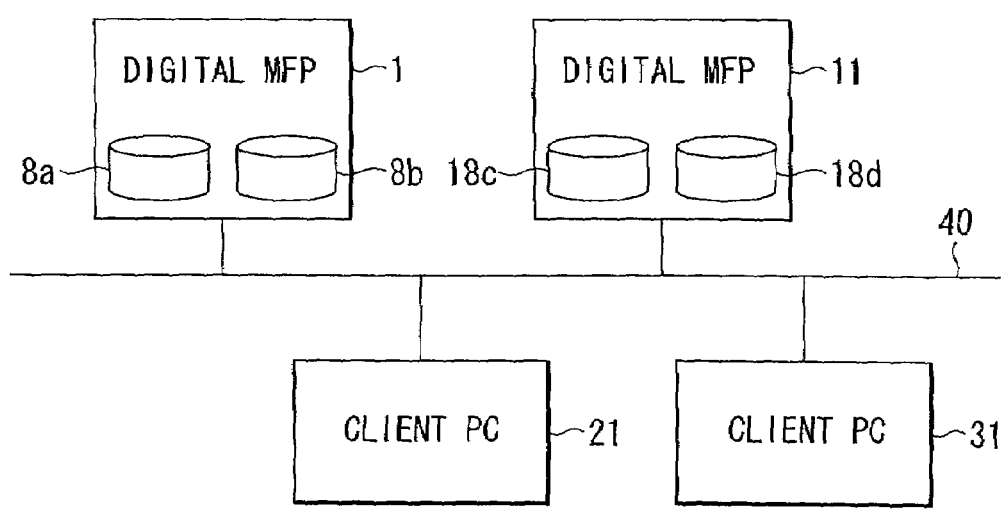
FIG. 6 is a view for describing a public folder in a digital MFP.

FIG. 6 is a view for describing the public folders in the digital MFP 1, 11 of the present network image forming system.

Public folders 8a and 8b are set in the image data storage section 8 of digital MFP 1, and the public folders are made public on the network 40. The right for access is set such that both the client PCs 21 and 31 can access the public folders. Specifically, by the setting of the operation section 3 of digital MFP 1, the public folders 8a and 8b are associated with group codes and provided in the image data storage section 8.

Public folders 18c and 18d are set in the image data storage section 18 of digital MFP 11, and the public folders are made public on the network 40. The right for access is set such that both the client PCs 21 and 31 can access the public folders. Specifically, by the setting of the operation section 13 of digital MFP 11, the public folders 18c and 18d are associated with group codes and provided in the image data storage section 18.

When the group codes are designated by the client PC 21 or 31 prior to the scan operation of the digital MFP 1, the digital MFP 1 can sort image data and store the sorted image data in the public folders 8a and 8b. In addition, when the group codes are designated by the client PC 21 or 31 prior to the scan operation of the digital MFP 11, the digital MFP 11 can sort image data and store the sorted image data in the public folders 8a and 8b.

In the present embodiment, two public folders are set on the hard disk drive. Alternatively, 200 public folders, for instance, can be set. In the case of a hard disk drive with a hierarchical structure, a greater number of public folders can be set.

Figure 7:
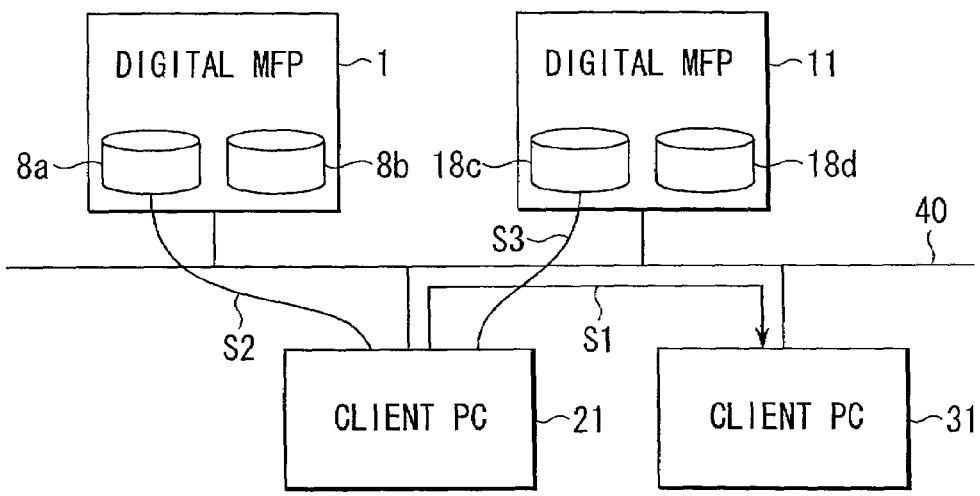
FIG. 7 is a view for describing the setting of a to-be-monitored folder by activation of the client PC.

FIG. 7 illustrates a procedure for setting and designating to-be-monitored folders in the client PC 21 and client PC 31. When the client PC 21 is activated to start the present system, the CPU 22 of client PC 21 transmits designated to-be-monitored folder list data of the client PC 21 to the client PC 31 from the network communication control section 27 to the network 40 (S1). The designated to-be-monitored folder list data is input by the client through the operation section 26 and prepared. Alternatively, designated to-be-monitored folder list data held in the hold section 24a of HDD 24 may be read out and transmitted.

For example, assume that data (list data) has been transmitted, for setting in the to-be-monitored folder the public folder 8a set in the image data storage section 8 by designating the IP address of the main control section 2 of digital MFP 1 and the public folder 8*c* set in the image data storage section 18 by designating the IP address of the main control section 12 of digital MFP 11.

At this time point, the client PC 31 is not activated, and thus no response is sent from the client PC 31 to the client PC 21. Accordingly, the CPU 22 of client PC 21 recognizes that the designation of the public folders 8*a* and 18*c* as to-be-monitored folders has been approved and that the designation has been completed (S2, S3). The data relating to the designation is held in the hold section 24*a* of HDD 24 as designated to-be-monitored folder list data. Based on this designated to-be-monitored folder list data, the CPU 22 executes monitoring for the public folders 8*a* and 18*c*.

Figure 8:
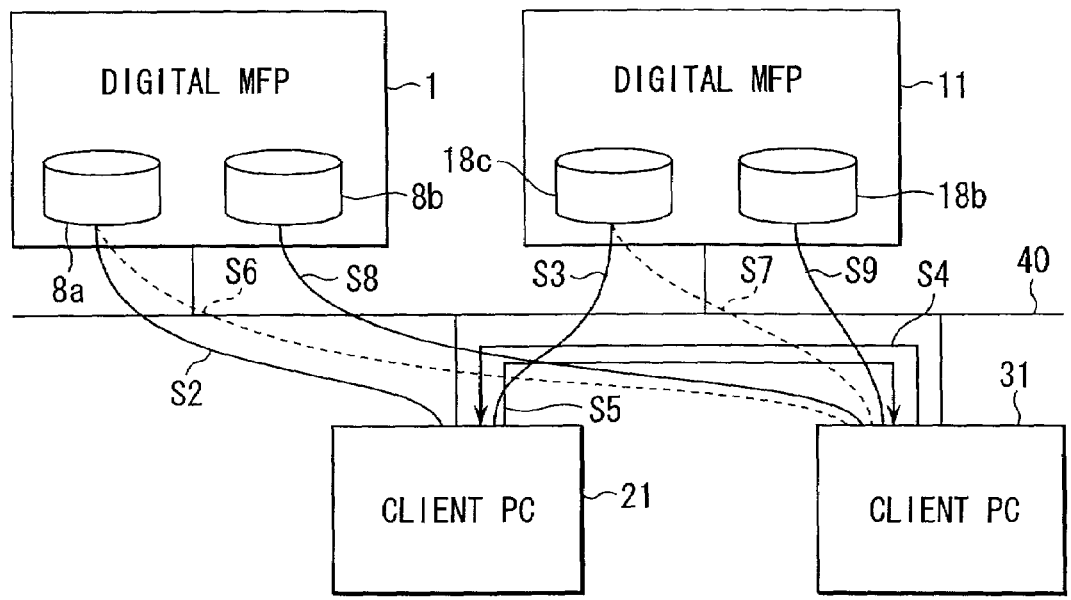
FIG. 8 is a view for describing an exclusion process for the setting of the to-be-monitored folder by the activation of the client PC.

FIG. 8 illustrates an exclusion process in the to-be-monitored folder setting in the case where the client PC 31 has been activated after the client PC 21 was activated.

Assume that the client PC 31 has been activated after the client PC 21 was activated, as described with reference to FIG. 7. In this case, the CPU 32 of client PC 31 transmits designated to-be-monitored folder list data of the client PC 31 to the client PC 21 from the network communication control section 36 via the network 40 (S4). The designated to-be-monitored folder list data is input by the client through the operation section 36 and prepared. Alternatively, designated to-be-monitored folder list data held in the hold section 34*a* of HDD 34 may be read out and transmitted.

For example, assume that designated to-be-monitored folder list data indicates that the public folders 8*a* and 8*b* of digital MFP 1 and the public folders 18*c* and 18*d* of digital MFP 11 are designated as to-be-monitored folders.

Upon receiving the designated to-be-monitored folder list data of the client PC 31, the CPU 22 of client PC 21 collates it with the designated to-be-monitored folder list data held in the hold section 24*a* of HDD 24. The CPU 22 of client PC 21 returns to the client PC 31 permission/non-permission data which rejects ("exclusion process") designation of the public folders 8*a* and 18*c* already set as to-be-monitored folders, and permits designation of the other public folders (8*b*, 18*d*) (S5).

Upon receiving the permission/non-permission data from the client PC 21, the CPU 32 of client PC 31 invalidates the negated designation ("exclusion process") of to-be-monitored folders (public folders 8*a* and 18*c*) (S6, 7) and sets the permitted public folders 8*b* and 18*d* to be to-be-monitored folders (S8, 9). The data on this setting is held in the hold section 34*a* of HDD 34 as designated to-be-monitored folder list data. Based on this designated to-be-monitored folder list data, the CPU 32 executes monitoring for the public folders 8*b* and 18*d*. In short, the client PC 31 starts monitoring for only the to-be-monitored folders, the designation of which was permitted.

As has been described above, the public folders to be monitored do not overlap between the client PCs, and each public folder is monitored by only one associated client PC.

Figure 9:
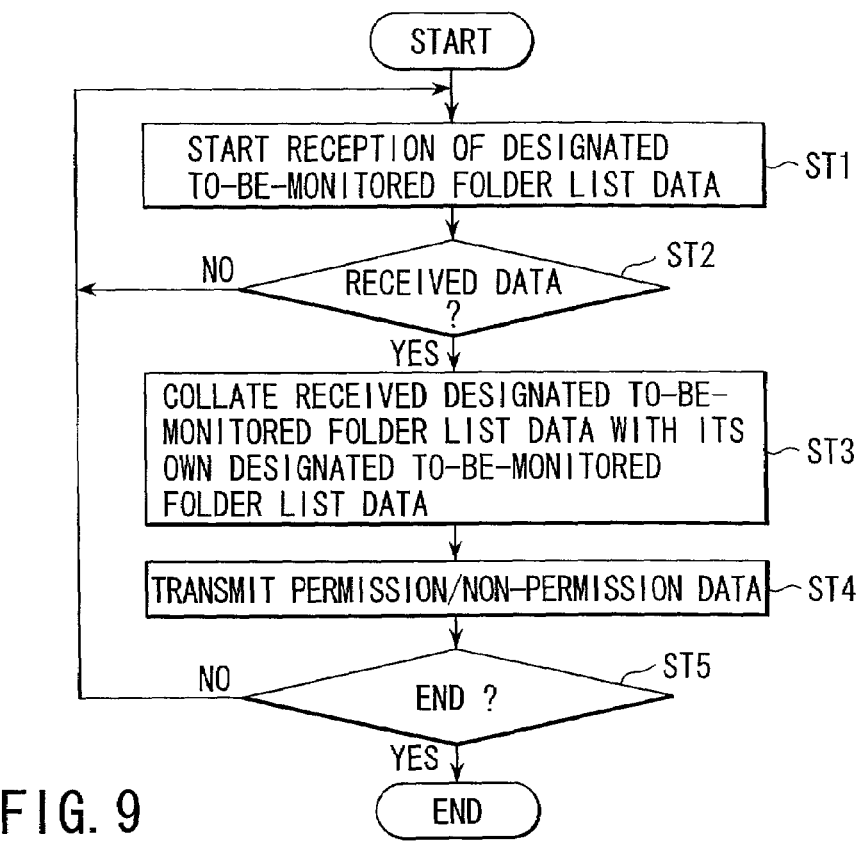
FIG. 9 is a flow chart illustrating an operation for collating lists of designated to-be-monitored folders.

The operation (S5) for collating the designated to-be-monitored folder lists in the above structure, as described with reference to FIGS. 7 and 8, will now be described referring to a flow chart of FIG. 9.

As has been described with reference to FIG. 7, when the CPU 22 of client PC 2 has executed the monitoring of the public folders 8*a* and 18*c* on the basis of the to-be-monitored folder setting, the CPU 22 starts receiving the designated to-be-monitored folder list data from some other client PC (ST1).

When the CPU 22 has received the designated to-be-monitored folder list data from the client PC 31 (ST2), as described with reference to FIG. 8, the CPU 22 immediately collates this data with the designated to-be-monitored folder list data held in the hold section 24*a* of HDD 24 (ST3).

The CPU 22 sets a flag of permission on a non-overlapping folder in the designated to-be-monitored folder list data, and sets a flag of non-permission on an overlapping folder in the designated to-be-monitored folder list data. The CPU 22 transmits permission/non-permission data as a collation result to the client PC 31 (ST4).

If the operation of the network image forming system is continued (ST5), the CPU 22 returns to the state of waiting for the designated to-be-monitored folder list data (ST1, 2). The CPU 22 repeats this operation until the system is finished.

Figure 10:
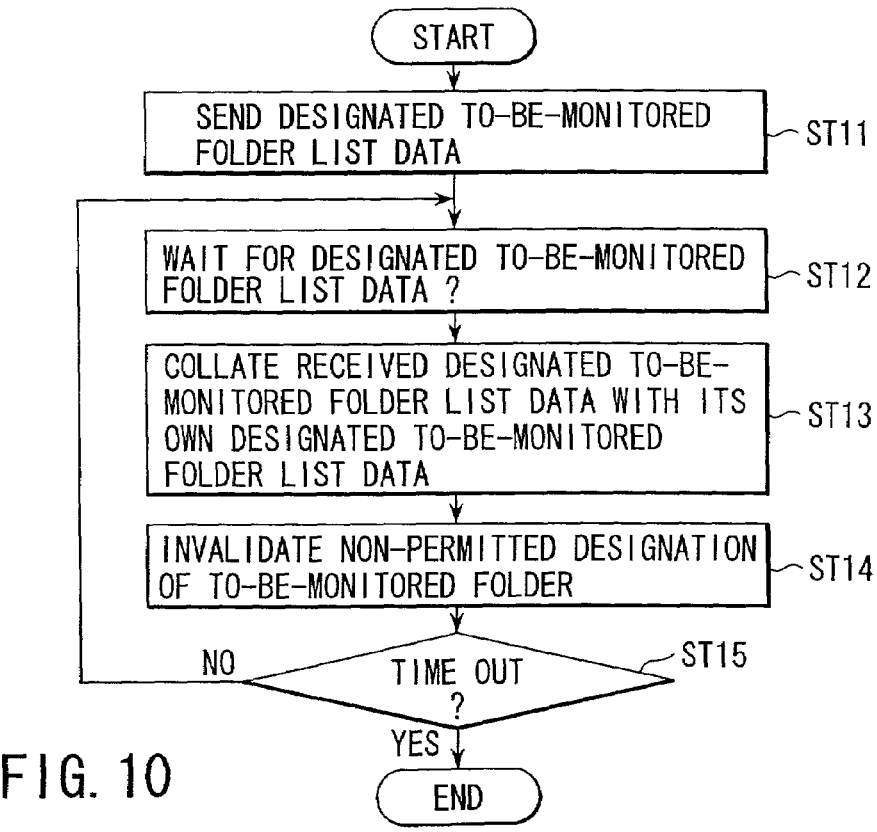
FIG. 10 is a flow chart illustrating an operation for receiving data on a designated to-be-monitored folder list from some other client PC.

An operation for receiving designated to-be-monitored folder list data from some other client PC will now be described with reference to a flow chart of FIG. 10.

The CPU 32 of client PC 31, as has been described with reference to FIG. 8, broadcasts the designated to-be-monitored folder list data held in the hold section 34*a* of HDD 34 via the network 40 (to all client PCs) (ST11).

The CPU 32 then enters the state of waiting for the designated to-be-monitored folder list data returned from some other PC (ST12).

Upon receiving the designated to-be-monitored folder list data from some other client PC, for instance, the client PC 22, the CPU 32 collates the permission/non-permission data on the designated to-be-monitored folder list data from the client PC 22 with its own designated to-be-monitored folder list data (ST13) and invalidates the non-permitted designation of to-be-monitored folders (ST14).

The CPU 32 repeats steps ST12 to ST14 for a predetermined time period (time-out), that is, until the permission/non-permission of designated to-be-monitored folder list data has been received from all client PCs (ST15).

Thus, the exclusion process by the plural client PCs on the present network image forming system is completed.

Figure 11:
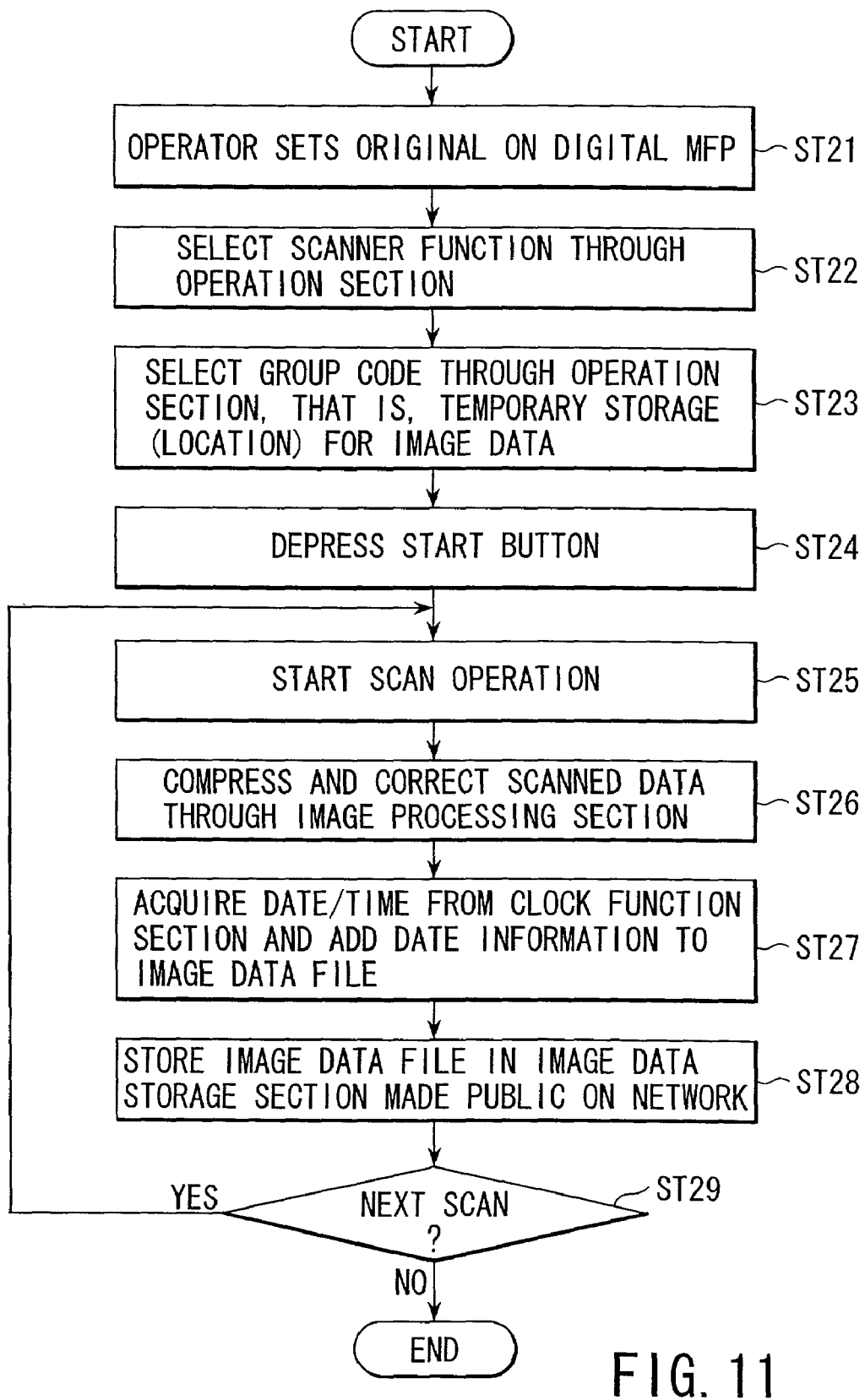
FIG. 11 is a flow chart illustrating a processing operation in the digital MFP after the network image forming system has been set in operation.

A processing operation in the digital MFP, in the state after the present network image forming system was set in operation, will now be described with reference to a flow chart of FIG. 11.

To start with, an operator sets an original on the digital MFP 1 (ST21). A scanner function is selected through the operation section 3 (ST22). In addition, a group code (a temporary storage location for image data: e.g. public file 8*a*) is selected (ST23).

When the start button 3*a* of the operation section 3 is depressed (ST24), the main control section 2 of digital MFP 1 causes the scanner section 4 to immediately start the scan operation (ST25).

When the scan operation is completed, the main control section 2 causes the image processing section 7 to compress and correct the scan data (ST26). The main control section 2 acquires present date/time data as the date/time of scan from the clock function section 9 and adds the date/time data to the image data file (ST27). The main control section 2 stores the image data file in the image data storage section made public on the network, that is, in the public file 8*a* provided in the image data storage section 8 (ST28).

The main control section 2 repeats steps ST25 to ST28 until there remains no original on the document table, and finishes the operations when no original remains on the table (ST29).

Figure 12:
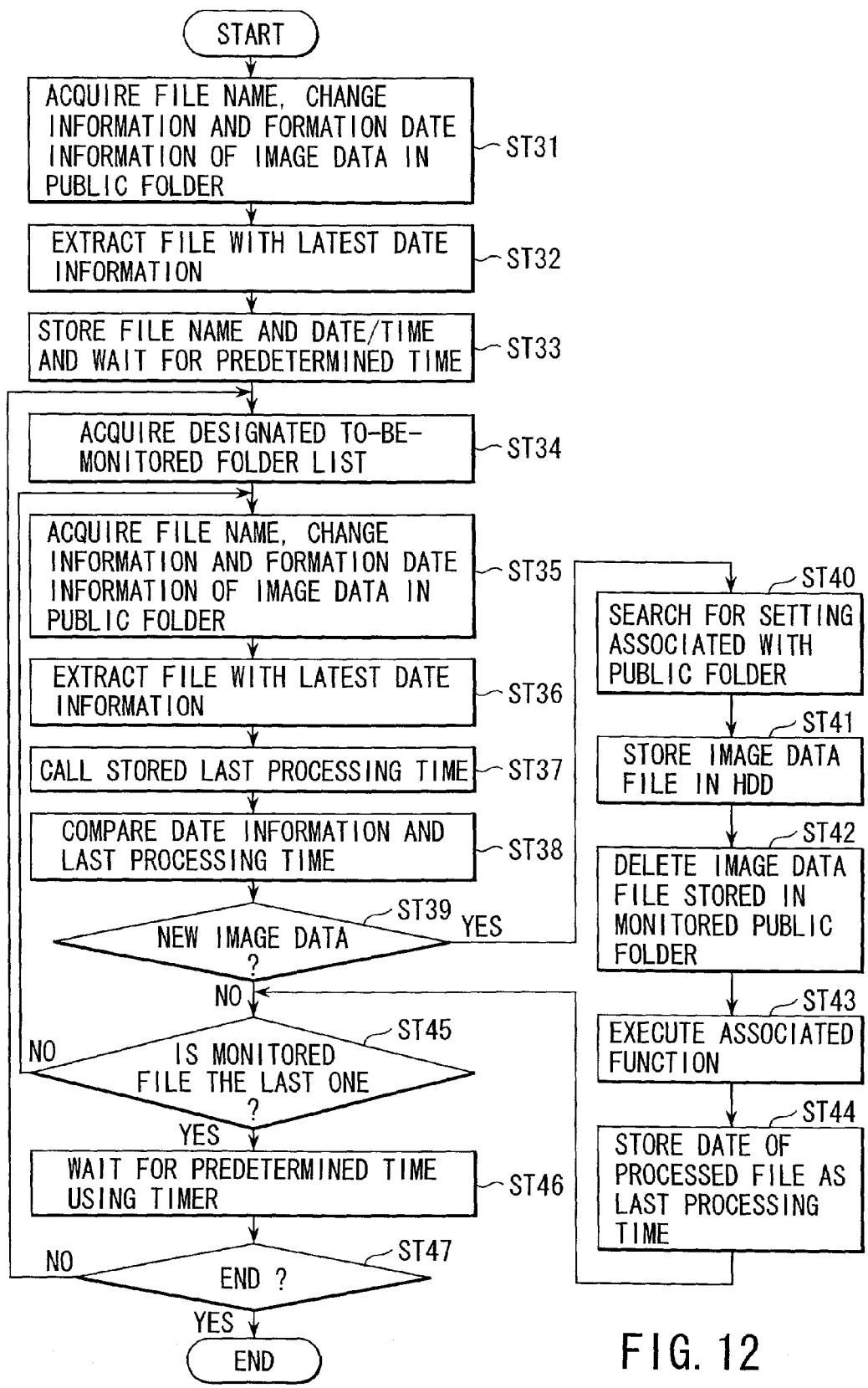
FIG. 12 is a flow chart illustrating a processing operation on the client PC side after image data has been stored in the public folder.

A processing operation on the client PC side, in the state after image data was stored in the public folder, will now be described with reference to a flow chart of FIG. 12.

The CPU 22 of client PC 21 reads out, in a pre-processing at the time of start of operations, current designated to-bemonitored folder list data held in the hold section 24a of HDD 24, and acquires a file name, change information and date information of all image data stored in the to-be-monitored folder via the network 40 (ST31).

When the designated to-be-monitored folder list data is transmitted via the network 40, the above-described exclusion process is performed for public folders, which are the to-be-monitored files of other client PCs. In this example, the to-be-monitored folders monitored by the CPU 22 are the public folder 8a of the digital MFP 1 and the public folder 18c of digital MFP 11.

The CPU 22 extracts a file with latest date information from the acquired and formed list (ST32). The CPU 22 stores the file name and date/time data in the memory 23 and stands by for a predetermined time period using the timer 22a (ST33).

After completing the pre-processing, the CPU 22 acquires the designated to-be-monitored folder list data held in the hold section 24a of HDD 24 (ST34) and, based on the designated to-be-monitored folder list data, acquires the file name, change information and formation date information of all image data stored in the to-be-monitored folder (public folder) via the network 40 for each designated to-be-monitored folder (ST35).

The CPU 22 extracts an image data file with latest date information (ST36).

The CPU 22 reads out the date/time stored in the memory 23 in the pre-process or the final processing time of the process file stored in the memory 23 (to be described later) (ST37) and compares it with the date information (date/time) of the latest file extracted in step ST36 (ST38).

If the comparison result shows that the date/time of the latest file is updated, the CPU 22 determines the presence of new image data. If the comparison result shows that the date/time of the latest file is not updated, the CPU 22 determines the absence of new image data, and the CPU 22 goes to step ST45 (ST39).

If the presence of new image data is determined in step ST39, the CPU 22 searches, via the network 40, for the setting data associated with the public folder thereof, e.g. the public folder 8a of digital MFP 1 (ST40) and stores the image data file including the search result in the HDD 24 (ST41).

The CPU 22 deletes this image data file stored in the monitored public folder 8a of digital MFP 1 (ST42).

The CPU 22 then performs its operations on the basis of the acquired setting data associated with the public folder 8a (ST43).

After the process of step ST43 is completed, the CPU 22 performs a post-process in which the date of the processed image data file is stored in the memory 23 as a final process time (ST44). The final process time is read out as the final process time of the processed file stored in the memory 23, as has been described in connection with step ST37.

After the completion of step ST44 or after the absence of new image data is determined in step ST39, the CPU 22 determines whether the to-be-monitored folder is the last one or not (ST45). If there remains another to-be-monitored folder, the control returns to step ST35. If there remains no to-be-monitored folder, the CPU 22 stands by for a predetermined time period using the timer 22a (ST46).

After the predetermined time period has passed in step ST46, if the operation of the network image forming system is not finished, the CPU 22 returns to step ST34. If the operation of the network image forming system is finished, the CPU 22 finishes its operation (ST47)

Figure 13:
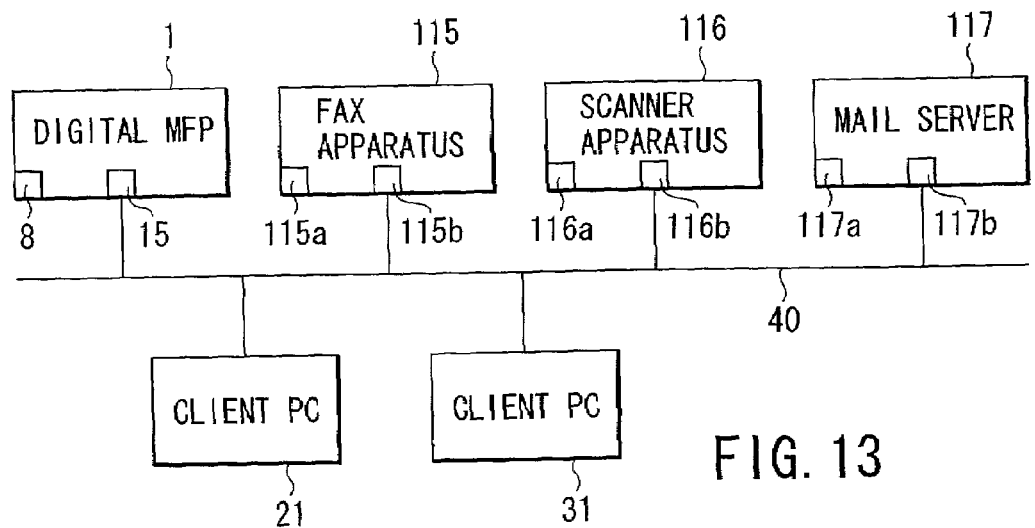
FIG. 13 shows an example of application of the image input system according to the present invention.

FIG. 13 shows an example of application of the image input system according to the present invention. Specifically, this image input system comprises a digital MFP 1 including the image data storage section 8 (shown in FIG. 2), a network communication control section 15 for controlling the connection to the network, and a scanner function; a facsimile apparatus 115 which includes an image data storage section 115a and a network communication control section 115b for controlling the connection to the network; a scanner apparatus 116 which includes an image data storage section 116a and a network communication control section 116b for controlling the connection to the network and inputs image data of an original; and a mail server 117 which includes an image data storage section 117a and a network communication control section 117b for controlling the connection to the network and receives/transmits e-mails via the Internet (not shown). These devices are connected to the network 40. In addition, the client PC 21 and client PC 31, shown in FIG. 1, are connected to the network 40.

Like the image data storage section 8 of digital MFP 1, the image data storage section 115a, 116a, 117a is configured to permit setting of a public folder to be made public on the network. The public folder can be monitored by the client PC 21, 31. With this structure, the client PC 21, 31 can collect image data, irrespective of the type of information sources, such as the digital MFP 1, facsimile apparatus 115, scanner apparatus 116 and mail server 117. In addition, an action set in the client PC 21, 31 can be executed. Thereby, facsimile data, scanner data and mail files, which are separately stored and managed in the prior art, can be managed in a centralized manner.

Figure 14:
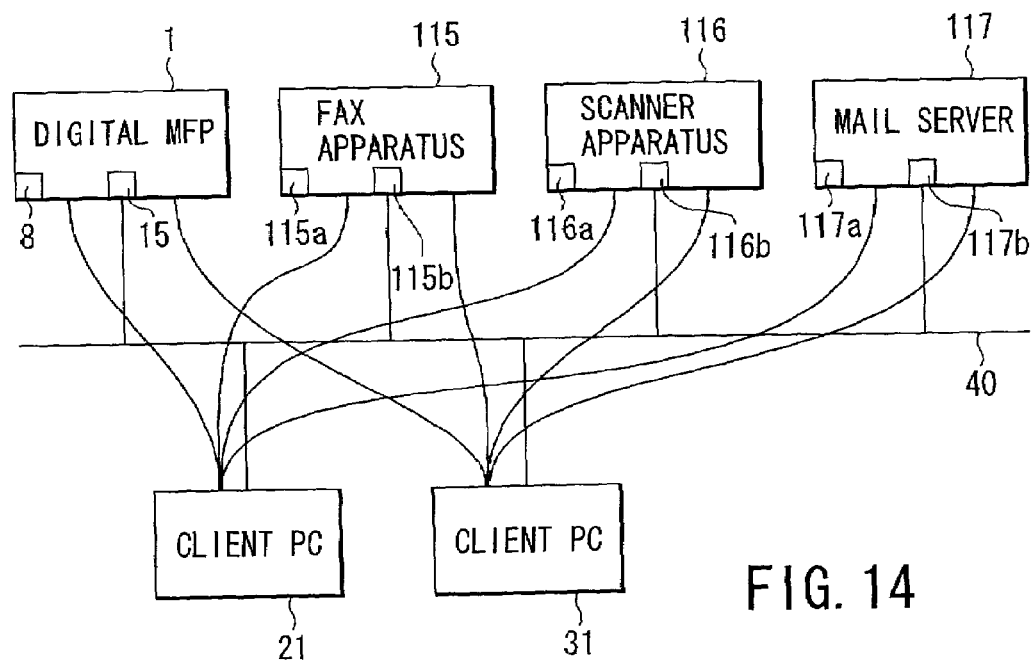
FIG. 14 shows an example of the structure of the to-be-monitored files in the image input system.

FIG. 14 shows an example of the configuration of the to-be-monitored files in the image input system shown in FIG. 13. In this example, assume that at least two public folders are set in each of the image data storage sections 8, 115a, 116a and 117a.

The client PC 21, for instance, can designate, as to-be-monitored folders, the public folders set in the digital MFP 1, facsimile apparatus 115, scanner apparatus 116 and mail server 117, and can acquire image data stored in the public folders or image data to be stored therein.

The client PC 21 can also designate, as to-be-monitored folders, the public folders set in the digital MFP 1, facsimile apparatus 115, scanner apparatus 116 and mail server 117, and can acquire image data stored in the public folders or image data to be stored therein. Of course, the above-described exclusion process is performed in designating the to-be-monitored folders.

As has been described above, according to the embodiments of the present invention, as regards conventional procedures of the pre-setting of the digital MFP, the scan operation, the copying of image data files, the activation of application programs and the opening of files, it is possible to automate the procedures of the copying of image data files, the activation of application programs and the opening of files.

Thereby, when a large amount of image data files are to be processed, the productivity is enhanced by reducing the number of processing steps.

In the prior art, in order to carry out these procedures, the user has to be familiar with not only the operations of the digital MFP, but also the operations (network application) of the PC. With the advent of the present image input system, one can carry out the series of procedures, only if he/she is familiar with the scan operations of the digital multi-functional peripheral (MFP) and the operations of application software of the PC. This makes it unnecessary to give instruction to the user in operations of networks and personal computers, resulting in cost reduction.

Furthermore, a plurality of client PCs are not permitted to monitor the same public folder in a digital MFP. After the transfer of an image data file to a client PC is finished, the image data file may be deleted from the client PC, to solve the problem of security, i.e. unauthorized use of the image data file.

The present invention is not limited to the above embodiments, and various modifications may be made in practice without departing from the spirit of this invention. The embodiments may be combined, if possible, and advantages of the combined embodiments can be obtained. Moreover, the embodiments include inventions of respective stages, and various inventions may be extracted by suitable combinations of the disclosed structural elements. For example, even if some structural elements are omitted from the structural elements of the embodiments, if the objects of the invention described in the Summary of the Invention are achieved and the advantages of the invention described in the specification are obtained, the structure from which the structural elements are omitted is extracted as an invention.

What is claimed is:

1. An image input system in which a plurality of image forming apparatuses, each having a scanner function, a printer function and a network function and forming an image, and a plurality of personal computers are connected to a network, each of the image forming apparatuses comprising:
first setting means for setting a public folder made public on the network; and
first storage means for setting therein at least one public folder through the setting by the first setting means;
each of the personal computers comprising:
second storage means for storing image data;
second setting means for setting exclusion of access by another personal computer to the public folder set in the image forming apparatus;
transmission means for transmitting to said another personal computer via the network access exclusion setting information for excluding access to said at least one public folder set by the second setting means;
reception means for receiving via the network permission/non-permission information on the access exclusion setting, which is returned from said another personal computer in response to said access exclusion setting information transmitted by the transmission means; and
control means for executing a control, in the presence of new image data in at least one public folder, on which access has been permitted in the access exclusion setting, on the basis of the permission/non-permission information on the access exclusion setting, which has been received by the reception means, to read the new image data from the public folder and store it in the second storage means, and delete the new image data from the public folder.

2. An image input system according to claim 1, wherein said storage means is a hard disk drive.

3. An image input system according to claim 1, wherein the public folder set in the storage means can be accessed by any one of said plurality of personal computers via the network.

4. An image input system according to claim 1, wherein the public folder set in the storage means stores image data, which is scanned by the scanner function when the public folder is designated by the operation of the image forming apparatus.

5. An image input system according to claim 1, wherein said second setting means, said transmission means, said reception means and said control means are operated according to an application program prestored in the personal computer.

6. An image input system according to claim 1, wherein the image forming apparatus, for which the setting by the second setting means is performed, is designated with use of an IP address.

7. An image input system according to claim 1, wherein said permission/non-permission information is information for rejecting access by another personal computer to the public folder, the access to which by said another personal computer is excluded by the present personal computer, and for permitting access by said another personal computer to the public folder, the access to which by said another personal computer is not excluded by the present personal computer.

8. An image input system according to claim 1, wherein said control means invalidates the setting of access to a public folder, the access to which is not permitted by the permission/non-permission information on the access exclusion setting returned from any one of the other personal computers.

9. An image input system according to claim 1, wherein said control means controls reading and deletion of image data stored in at least one of said public folders, the access to which has been permitted in the access exclusion setting.

10. An image input system according to claim 1, wherein said control means controls reading and deletion of image data stored in at least one of said public folders, the access to which has been permitted in the access exclusion setting, and also controls, when there is associated setting data, execution of a function based on the associated setting data.

11. An image input system in which a plurality of image forming apparatuses, each having a scanner function, a printer function and a network function and forming an image, and a plurality of personal computers are connected to a network, each of the image forming apparatuses comprising:
first setting means for setting a public folder made public on the network; and
first storage means for setting therein at least one public folder through the setting by the first setting means;
each of the personal computers comprising:
second storage means for storing access exclusion setting information which excludes access by another personal computer to the public folder set at the time of activation, and image data stored in at least one public folder of the image forming apparatus;
reception means for receiving via the network access exclusion setting information, which is sent from another personal computer;
preparation means for comparing the access exclusion setting information received by the reception means with the access exclusion setting information stored in the second storage means, and preparing permission/non-permission information that rejects access to a public folder on which the exclusion of access has been set, and that permits access to a public folder on which the exclusion of access is not set; and
returning means for returning the permission/non-permission information prepared by the preparation means to the personal computer, via the network from which the access exclusion setting information was received by the reception means and control means for executing a control, in the presence of new image data in at least one public folder, on which access has been permitted in the access exclusion setting, on the basis of the permission/non-permission information on the access exclusion setting stored in the second storage means, to read the new image data from the public folder and store it in the second storage means, and delete the new image data from the public folder.

12. An image input system in which a plurality of image forming apparatuses, each having a scanner function, a printer function and a network function and forming an image, and a plurality of personal computers are connected to a network,
  each of the image forming apparatuses comprising:
    first setting means for setting a public folder made public on the network; and
    first storage means for setting therein at least one public folder through the setting by the first setting means;
  each of the personal computers comprising:
    second storage means for storing access exclusion setting information which excludes access by another personal computer to the public folder set in the image forming apparatus, and image data stored in at least one public folder of the image forming apparatus;
    transmission means for transmitting the access exclusion setting information stored in the second storage means to another personal computer via the network at the time of activation;
    reception means for receiving via the network permission/non-permission information on the access exclusion setting returned to said another personal computer in response to the access exclusion setting information transmitted by the transmission means; and
    control means for executing a control, in the presence of new image data for in at least one public folder, on which access has been permitted in the access exclusion setting, on the basis of the permission/non-permission information on the access exclusion setting, which has been received by the reception means, to read the new image data from the public folder and store it in the second storage means, and delete the new image data from the public folder.

13. A computer system for managing images from an image forming apparatus having a scanner function, a printer function and a network function connected via a network, the computer system comprising:
  a network interface that provides communication between the computer system and the network;
  a processor;
  a memory coupled to the processor, the memory comprising a plurality of instructions executed by the processor, the plurality of instructions configured to:
    designate a list of one or more public folders to access on the image forming apparatus;
    transmit data identifying the designated list of one or more public folders to one or more other computer systems coupled to the network;
    receive data from at least one of the one or more other computer systems identifying one or more public folders to be excluded from access;
    remove the one or more public folders to be excluded from access from the designated list of one or more public folders to access;
    read new image data stored in a public folder of the image forming apparatus that corresponds to any one of the designated list of one or more public folder to access;
    store the read image data in a storage area of the computer system; and
    cause the new image data stored in the public folder of the image forming apparatus to be deleted from the public folder of the image forming apparatus.

14. A method for managing images from an image forming apparatus having a scanner function, a printer function and a network function connected via a network to at least two computer systems, the method comprising:
  designating a list of one or more public folders to access on the image forming apparatus;
  transmitting data identifying the designated list of one or more public folders to one or more computer systems coupled to the network;
  receiving data from at least one of the one or more computer systems identifying one or more public folders to be excluded from access;
  removing the one or more public folders to be excluded from access from the designated list of one or more public folders to access;
  reading new image data stored in a public folder of the image forming apparatus that corresponds to any one of the designated list of one or more public folder to access;
  storing the read image data in a storage area of the computer system; and
  causing the new image data stored in the public folder of the image forming apparatus to be deleted from the public folder of the image forming apparatus.

* * * * *